US008311272B2

(12) United States Patent
Matsugu et al.

(10) Patent No.: US 8,311,272 B2
(45) Date of Patent: Nov. 13, 2012

(54) IMAGE PROCESSING APPARATUS FOR IDENTIFYING AN INDIVIDUAL OBJECT, IMAGE PROCESSING METHOD, AND STORAGE MEDIUM

(75) Inventors: Masakazu Matsugu, Yokohama (JP); Katsuhiko Mori, Kawasaki (JP); Takashi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1147 days.

(21) Appl. No.: 11/771,382

(22) Filed: Jun. 29, 2007

(65) Prior Publication Data
US 2008/0002862 A1    Jan. 3, 2008

(30) Foreign Application Priority Data
Jun. 30, 2006 (JP) ................. 2006-182180

(51) Int. Cl.
*G06K 9/00* (2006.01)
*G06K 9/62* (2006.01)
(52) U.S. Cl. .................. 382/103; 382/224; 382/305
(58) Field of Classification Search ........... 382/100–317
See application file for complete search history.

(56) References Cited

U.S. PATENT DOCUMENTS

| 5,063,603 A * | 11/1991 | Burt | 382/115 |
|---|---|---|---|
| 5,771,307 A * | 6/1998 | Lu et al. | 382/116 |
| 6,967,674 B1 * | 11/2005 | Lausch | 348/143 |
| 7,016,532 B2 * | 3/2006 | Boncyk et al. | 382/165 |
| 7,391,907 B1 * | 6/2008 | Venetianer et al. | 382/224 |
| 7,447,334 B1 * | 11/2008 | Jiang et al. | 382/103 |
| 7,841,300 B2 * | 11/2010 | Skvorc, II | 119/712 |

FOREIGN PATENT DOCUMENTS

| JP | 09-130714 | 5/1997 |
|---|---|---|
| JP | 10-275237 | 10/1998 |
| JP | 3078166 | 6/2000 |
| JP | 2002-008032 | 1/2002 |
| JP | 2003-263639 | 9/2003 |
| JP | 2005-339000 A | 12/2005 |

OTHER PUBLICATIONS

Huang et al., "Face Recognition Using Component-Based SVM Classification and Morphable Models" Lecture Notes in Computer Science LNCS2388, Springer-Verlag, 2002, pp. 334-341.
Guo, Li, and Chan, "Face Recognition by Support Vector Machines" in Proc. of 14th International Conf. on Automatic Face and Gesture Recognition, 2000.

(Continued)

*Primary Examiner* — Manav Seth
(74) *Attorney, Agent, or Firm* — Cowan, Liebowitz & Latman, P.C.

(57) ABSTRACT

An image capturing unit acquires an image including an object. A state detection unit detects the state of the object in the image. An individual recognition processing unit determines one of a plurality of individual identification process modules in correspondence with the state detected by the state detection unit. The individual recognition processing unit executes, for the object in the image, an individual identification process by the determined individual identification process module.

13 Claims, 10 Drawing Sheets

OTHER PUBLICATIONS

Lawrence et al., "Face Recognition: A Convolutional Neural Network Approach", IEEE Transactions on Neural Networks, 1997, vol. 8, pp. 98-113.

"Automatic Facial Expression Recognition System Using Face Detection Convolutional Neural Network" 2nd Forum on Information Technology, 2003, Yuji Kaneda, et al. pp. 119-121, Japanese Document and English Translation.

Hiroshi Murase "Recognizing Individuals from the Silhouettes of Their Walk", IEICE Transactions, Japan, IEICE, vol. J75-D-II, No. 6, pp. 1096-1098 (Jun. 1992).

Takio Kurita et al. "Integration of Viewpoint Dependent Classifiers for Viewpoint Invariant Face Recognition", Japan, IEICE, vol. 99, No. 514, pp. 35-42, Technical Report of IEICE PRMU99-170 (Dec. 1999).

Takeshi Mita et al. "Probabilistic ISC for Matching Images of Objects Having Individual Difference", IEICE Transactions, Japan, IEICE, vol. J88-D-II, No. 8, pp. 1614-1623 (Aug. 2005).

The above reference and articles were cited in a Mar. 18, 2011 Japanese Office Action, which is enclosed without an English Translation, that issued in Japanese Patent Application No. 2006-182180.

* cited by examiner

IMAGE PROCESSING APPARATUS FOR IDENTIFYING AN INDIVIDUAL OBJECT, IMAGE PROCESSING METHOD, AND STORAGE MEDIUM

BACKGROUND OF THE INVENTION

1. Field of the Invention

The present invention relates to an image recognition technique, especially, to technique for identifying an individual object.

2. Description of the Related Art

A technique of recognizing an object under various conditions is disclosed in Japanese Patent Laid-Open No. 10-275237. Japanese Patent Laid-Open No. 10-275237 discloses a recognition technique that executes model fitting by detecting a moving region in an image and fitting a geometric model in that region.

A technique disclosed in Japanese Patent Laid-Open No. 2003-263639 registers face images corresponding to various facial directions in advance, calculates the collation scores of an input image with respect to the images of faces in the respective directions, selects a deformation parameter corresponding to a direction with a high collation score, converts the inputted image into a frontal face by using the selected deformation parameter, and collates it with a model image.

A technique examined in Huang et al., "Face Recognition Using Component-Based SVM Classification and Morphable Models" Lecture Notes in Computer Science LNCS2388, Springer-Verlag, 2002, pp. 334-341 generates a three-dimensional CG model from a sensed image, generates face images corresponding to various facial directions, and trains a support vector machine, thereby executing face recognition independent of directions and illumination variations.

In the above-described prior arts, however, it is difficult to efficiently and accurately identify an individual while coping with various states related to the poses, expressions, and illumination conditions of objects (e.g., identical persons) in the same class even when both the number of states and the number of individuals to be identified increase.

SUMMARY OF THE INVENTION

The present invention has been made in consideration of the above-described problem, and has as its object to provide a technique of more accurately identifying an individual object in an image.

According to one aspect of the present invention, an image processing apparatus comprising:

an acquisition unit adapted to acquire an image including an object;

a detection unit adapted to detect a state of the object in the image;

a determination unit adapted to determine one, which corresponds to the state detected by the detection unit, of a plurality of individual identification process modules; and an individual identification unit adapted to execute, for the object in the image, an individual identification process by the individual identification process module determined by the determination unit.

According to another aspect of the present invention, an image processing method comprising the steps of:

acquiring an image including an object;

detecting a state of the object in the image;

determining one, which corresponds to the state detected in the detecting step, of a plurality of individual identification process modules; and executing, for the object in the image, an individual identification process by the individual identification process module determined in the determining step.

Further features of the present invention will become apparent from the following description of exemplary embodiments with reference to the attached drawings.

DESCRIPTION OF THE EMBODIMENTS

Preferred embodiments of the present invention will be described below in detail with reference to the accompanying drawings.

First Embodiment

Figure 1:
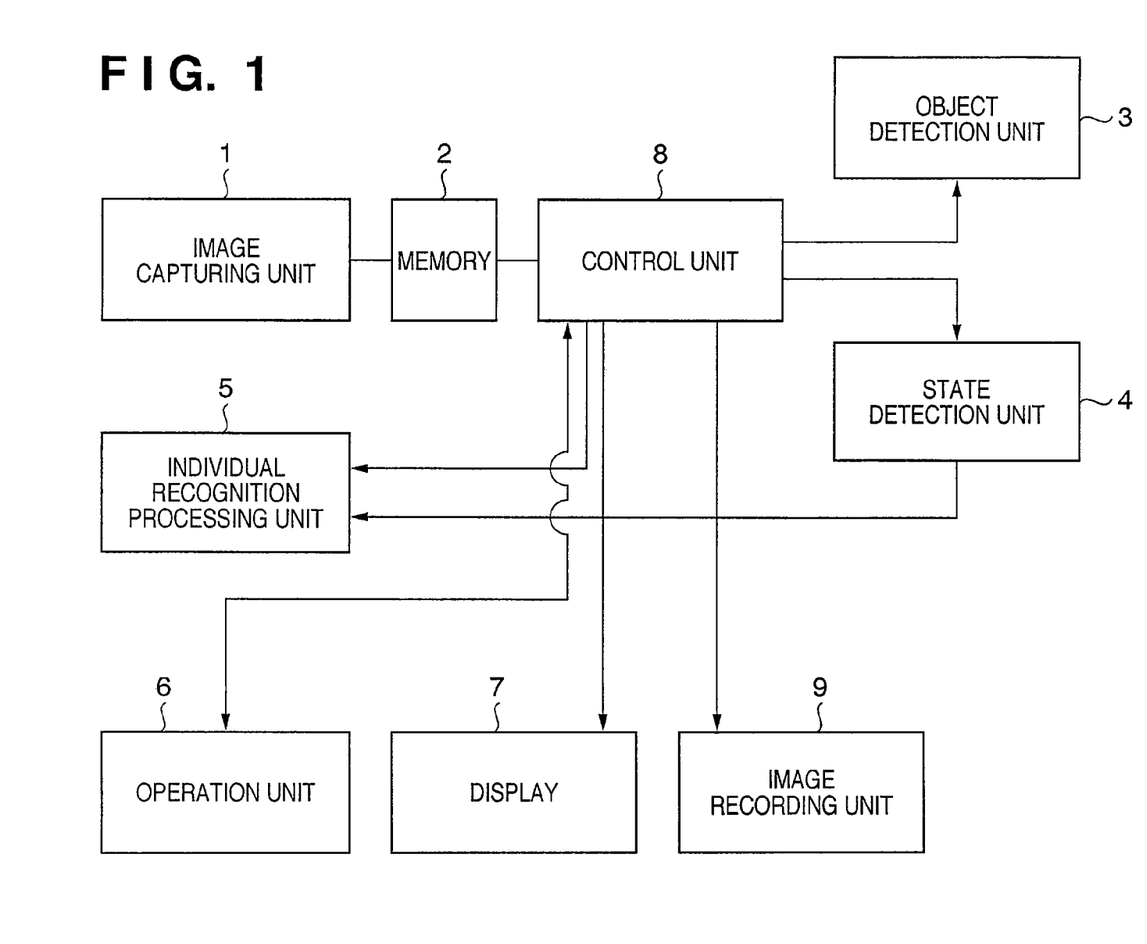
FIG. 1 is a block diagram showing the functional arrangement of an image processing apparatus according to the first embodiment of the present invention.

FIG. 1 is a block diagram showing the functional arrangement of an image processing apparatus according to this embodiment.

An image capturing unit 1 includes imaging optics such as lenses, an image sensor typically formed from a CCD or CMOS image sensor, a sensor signal processing circuit, and a sensor driving circuit. External light is converted into an electrical signal via the imaging optics and image sensor. Upon receiving a reading control signal from the sensor driving circuit, the image sensor outputs, to a memory 2, an image signal (e.g., a signal obtained by sub-sampling and block reading) designated by the control signal. That is, an image captured by the image capturing unit 1 is sent to the memory 2 as data. In this way, each frame (captured image) of a moving image captured by the image capturing unit 1 is sent to the memory 2.

The memory 2 stores image data sent from the image capturing unit 1 and various kinds of data to be used for processes to be described later.

An object detection unit 3 detects at least one object in a captured image held in the memory 2. The object detection unit 3 can be implemented by a dedicated chip (e.g., IP or ASIC), middleware, DSP, or a program module executed in a reconfigurable processor.

A state detection unit 4 detects a state of the object detected by the object detection unit 3.

An individual recognition processing unit 5 executes an individual identification process corresponding to the state detected by the state detection unit 4 for the object detected by the object detection unit 3.

An operation unit 6 includes buttons. The apparatus operator can designate, e.g., the type of object to be detected by the object detection unit 3 by operating the buttons.

A display 7 including, e.g., a liquid crystal panel can display various kinds of information.

An image recording unit 9 including a memory to save images and various devices for access control of the memory. More specifically, if the user designates a saving target of images captured by the image capturing unit 1 using the operation unit 6, the designated image is saved in the image recording unit 9.

A control unit 8 controls the operations of the above-described units.

All the units may be implemented by hardware, or some of them may be implemented by software. For example, when the object detection unit 3, state detection unit 4, and individual recognition processing unit 5 are implemented by hardware, these units include a dedicated circuit (ASIC) and a processor (e.g., reconfigurable processor, DSP, or CPU).

In a description to be made below, the category of an object detected from an image by the image processing apparatus according to this embodiment is "human face". For any other object, the fundamental part of the process to be described below does not change.

To select a category of a detection target object using the operation unit 6, for example, the following method is usable. A list of categories selectable as a category of a detection target object is displayed on the display screen of the display 7 as a menu. The operator selects at least one of the categories displayed as a menu using the operation unit 6.

Figure 2:
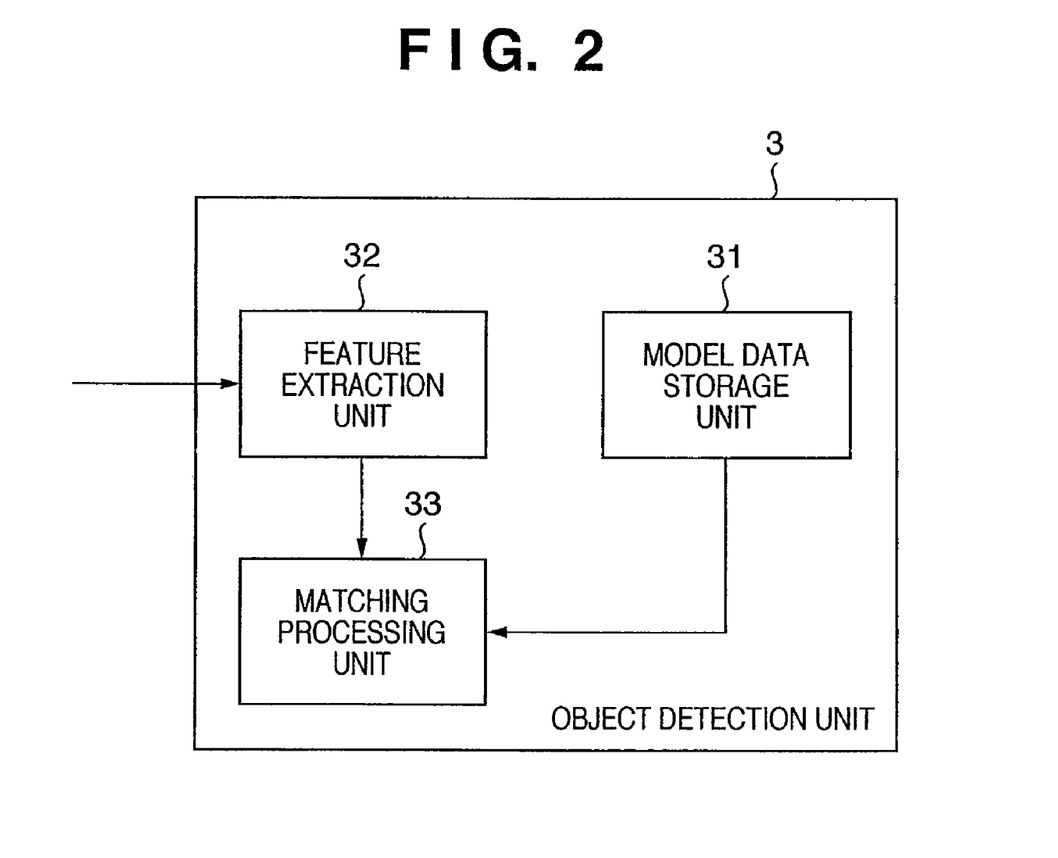
FIG. 2 is a block diagram showing a more detailed functional arrangement of an object detection unit 3.

FIG. 2 is a block diagram showing a more detailed functional arrangement of the object detection unit 3. As shown in FIG. 2, the object detection unit 3 includes a feature extraction unit 32, model data storage unit 31, and matching processing unit 33.

When image data is read out from the memory 2, the feature extraction unit 32 extracts a geometrical feature or another feature (e.g., color or motion vector information) at each position (sampling point) in the image. The matching processing unit 33 executes matching with model data or template matching on the feature amount base and detects a human face on the basis of the matching result. Upon detecting a face, the matching processing unit 33 outputs the face detection position in the input image. In this detection, a value (similarity) representing the degree of similarity between the detected "human face" region and a "human face" is obtained.

As model data about a human face, face image data, predetermined feature vector data related to an entire face obtained by principal component analysis or independent component analysis, or local feature data about characteristic regions of individual images, including eyes and mouth in a face are used. The model data storage unit 31 stores the model data. The matching processing unit 33 detects a human face by using the stored data.

A technique disclosed in Japanese Patent Laid-Open No. 9-130714 is usable in the process executed by the matching processing unit 33. This technique generates a template model image with a size corresponding to the object distance and calculates, e.g., a normalized correlation coefficient at each position while scanning the screen by using the model image, thereby calculating the similarity distribution between the model data and local parts of the input image.

An algorithm based on the spatial layout relationship of local features disclosed in Japanese Patent No. 3078166 or an algorithm based on a convolutional neural network disclosed in Japanese Patent Laid-Open No. 2002-8032 is also usable in the process executed by the matching processing unit 33. In general, when the maximum value of the similarly distribution exceeds a predetermined threshold value, a pattern belonging to the category is detected.

To shorten the process time of object detection, a preprocess of narrowing down the search range may be executed. More specifically, primary feature amounts (lower feature amounts such as a motion vector and color information) may be extracted from time series image data by a known method to extract candidate regions where an object can exist at a high probability. For example, an image region having a color close to the color of the main part (e.g., a flesh color of a person) of model image data registered in advance may be extracted by a threshold process based on color information. Alternatively, a region having a certain motion vector amount with a predetermined size or more or a detection region similar to a head of a person is extracted as an object candidate region (from the image regions).

In this embodiment, the image capturing unit 1 is fixed at a predetermined position. In, e.g., image capturing in a hand-holding state without fixing the image capturing unit 1, a global motion vector amount (Ego-motion vector) corresponding to the motion of the image capturing unit 1 itself is extracted and canceled from the overall motion vector distribution. Then, region segmentation based on the motion vector amount is done. This allows to obtain a candidate region of a moving object such as a person.

The operation of the state detection unit 4 will be described next. In this embodiment, the detection target object is a "human face". Hence, the state detection unit 4 detects a state class related to an expression or direction of a human face.

First, the state detection unit 4 detects feature points of facial parts such as outer canthi and a mouth effective for facial expression and direction detection from a region (face region) that appears to be a "human face" detected by the object detection unit 3. More specifically, the face region is normalized to a predetermined size. On the basis of feature points in a preceding frame (non-smiling face) of the face region and those obtained from a current frame, an expression detection process (e.g., Kaneda, Mori, Mitarai, & Matsugu, "Automatic Expression Recognition System Using Face Detection Convolutional Neural Network", 2nd Forum on Information Technology, 2003, pp. 119-121) is executed, and the direction of the face is detected. As a consequence, a state class such as "skew/expressionless" is detected.

Figure 8:
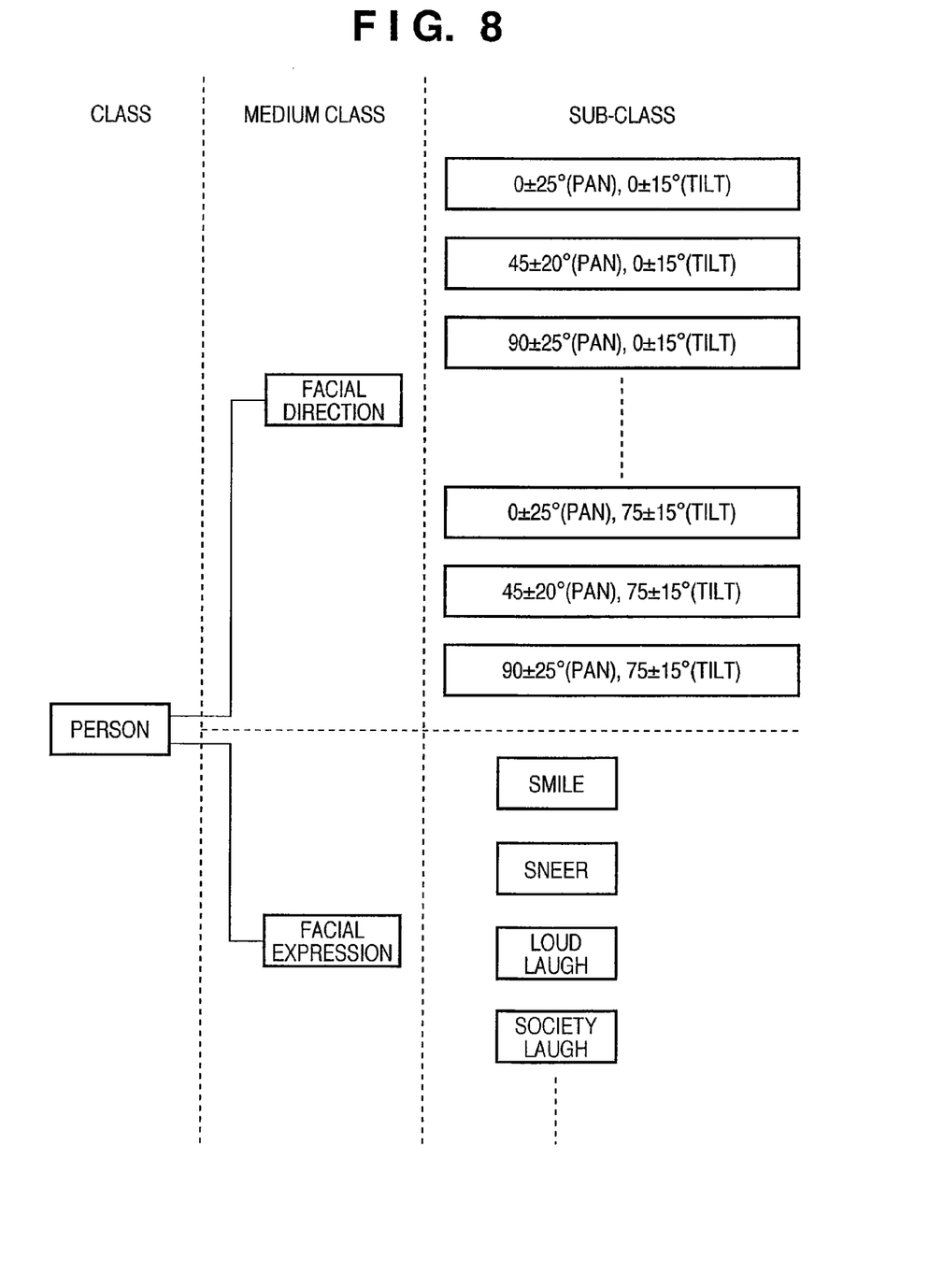
FIG. 8 is a view for explaining a detection process by a state detection unit 4.

FIG. 8 is a view for explaining a detection process by the state detection unit 4. As shown in FIG. 8, when the detection target object (human face) designated by the user is the state class of major class, the state detection unit 4 executes state detection in medium class and sub-class. The state classes are classified in advance in accordance with the type of object to be detected by the object detection unit 3. If the detection target is a human face as in this embodiment, the state classes are classified into, e.g., "expression" and "direction" (medium class) and stored in the state detection unit 4. Hence, the state detection unit 4 detects facial expression and direction. As shown in FIG. 8, the facial direction is subdivided in advance into classes (sub-classes) depending on the pan and tilt directions. The facial expression is subdivided in advance into classes (sub-classes) such as "smile", "sneer", "loud laugh", and "society laugh".

Figure 4:
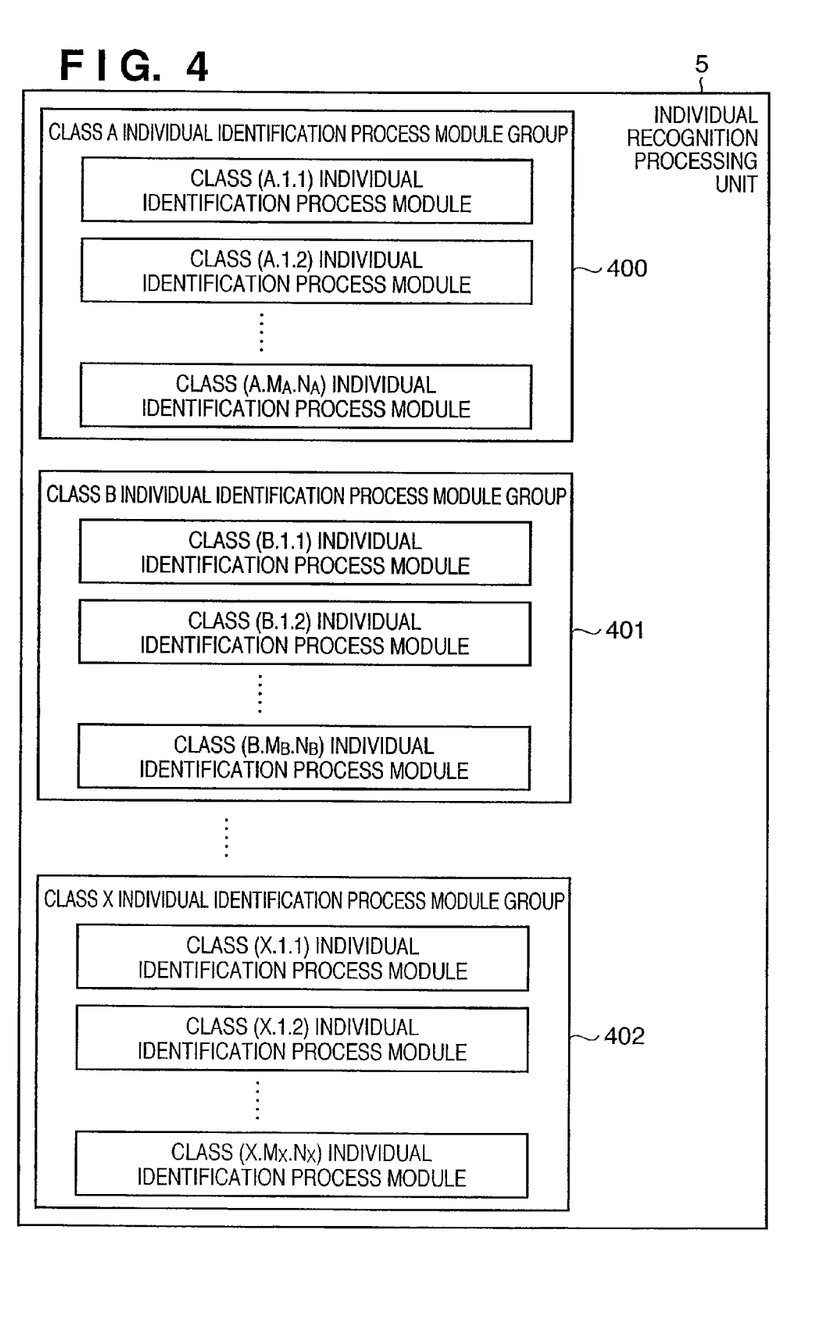
FIG. 4 is a block diagram showing the arrangement of an individual recognition processing unit 5.

The operation of the individual recognition processing unit 5 will be described next. The individual recognition processing unit 5 executes an individual identification process corresponding to the state class detected by the state detection unit 4 for the face region detected by the object detection unit 3. FIG. 4 is a block diagram showing the arrangement of the individual recognition processing unit 5.

As shown in FIG. 4, the state classes are classified by a tree structure of (major class, medium class, and sub-class) in advance. The individual recognition processing unit 5 holds process module groups of the respective major classes. Referring to FIG. 4, the individual recognition processing unit 5 holds process module groups 400 to 402 of class A, class B, and class X which are major classes. The state classes may be classified by any other format except a tree structure.

For example, when the process module group 401 executes an individual identification process for a human face, the individual recognition processing unit selects the process module group 401. In addition, when a process module corresponding to the state class (e.g., "frontal face/smile") detected by the state detection unit 4 is a "class (B.1.2) individual identification process module" in FIG. 4, the individual recognition processing unit 5 selects this process module. In this way, the individual recognition processing unit 5 selects an individual identification process module corresponding to a state class detected by the state detection unit 4 and executes an individual recognition process for a face region detected by the object detection unit 3 by using the selected process module.

The process modules shown in FIG. 4 need not always be provided in the individual recognition processing unit 5. They may be held in the control unit 8 as hardware IP cores or in the memory 2 as programs.

Each process module corresponding to a state class has relatively broad identification performance with focus on a corresponding specific state class. That is, even a process module specialized to "frontal face/smile" is generated in advance by learning so as to be able to execute individual identification robust against variations within a relatively wide range of facial directions and smiling faces (from "smile" to "loud laugh with open mouth").

As such a process module, a support vector machine capable of identifying, e.g., the faces of two specific persons in a specific state class is generated by learning. Learning is done by using faces within a certain range focused on a specific state class ("frontal face/smile"). For example, faces in a relatively wide range are used, including various smiling faces turning sideways within the range of ±20° from the front without a mouth wide open. By using the face data set about the two specific persons, a support vector machine is trained so that it can identify the two persons. A so-called one-against-all type support vector machine may be generated. In this case, support vector machines equal in number to identification target individuals are generated by training.

In this embodiment, support vector machines that execute binary identification of the specific state class are generated by learning equal in number to all combinations of pairs. The recognition process need not be executed for all combinations of pairs. Instead, when a binary tree recognition method is used, comparison of (number of classes—1) times suffices, as described in reference (Guo, Li, and Chan, "Face Recognition by Support Vector Machines" in Proc. of 14th International Conf. on Automatic Face and Gesture Recognition, 2000).

Figure 3:
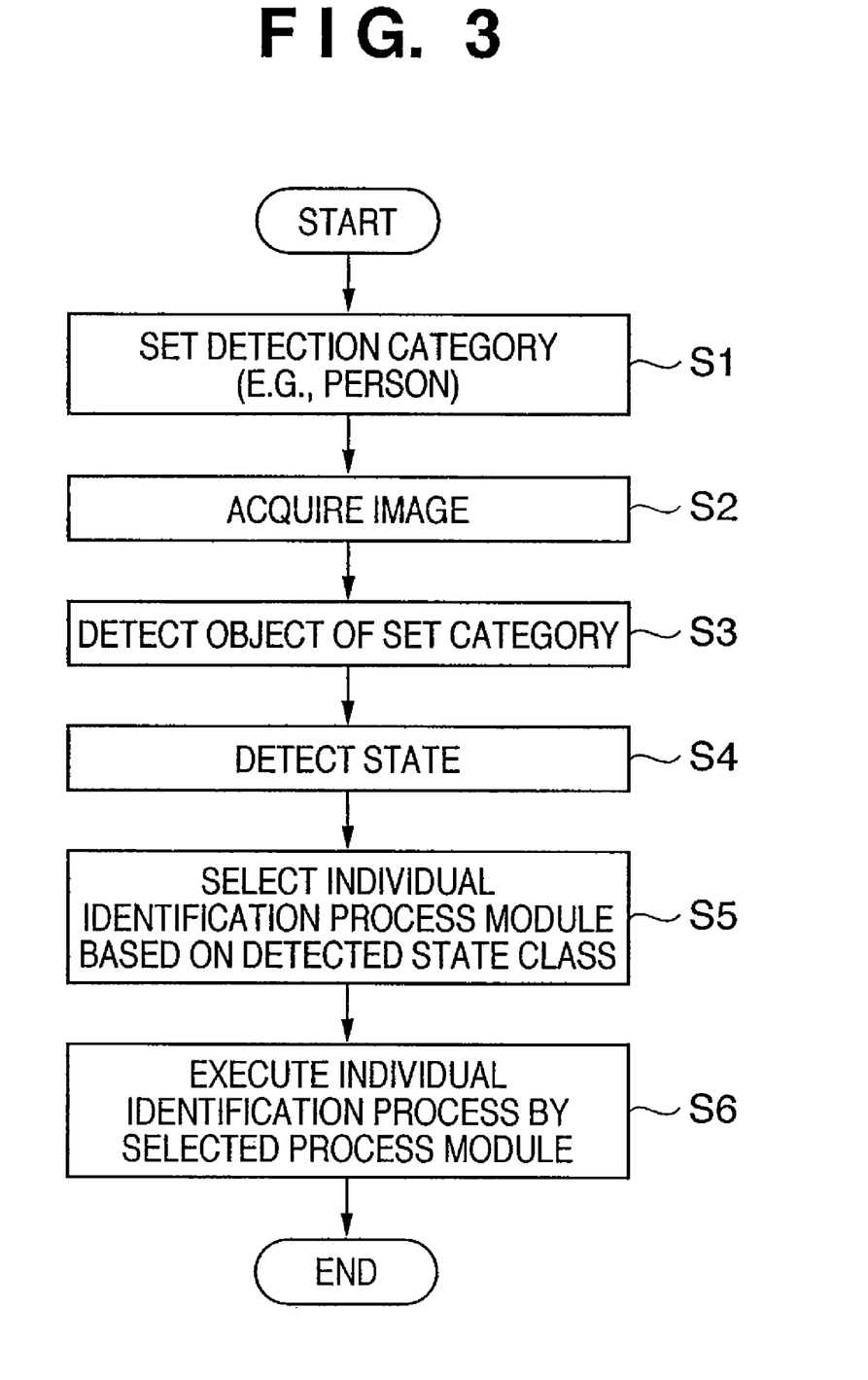
FIG. 3 is a flowchart of an individual identification process executed by the image processing apparatus according to the first embodiment of the present invention.

FIG. 3 is a flowchart of an individual identification process executed by the image processing apparatus according to this embodiment. A memory (not shown) in the control unit 8 stores a program and data to make the units of the image processing apparatus execute the process according to the flowchart in FIG. 3. A CPU (not shown) in the control unit 8 executes the process by using the program so that the image processing apparatus of this embodiment executes each process to be described below.

The user of the apparatus selects, by using the operation unit 6, the category of a target object to be subjected to the individual identification process from a "menu to select the category of a detection target object" displayed on the display 7. This selection instruction is output to the control unit 8. Upon receiving the selection instruction, the control unit 8 determines the category of the detection target object in step S1. In the above-described example, the control unit 8 sets "human face" as the category of the detection target object. "Vehicle" or "pet" may be settable as the object category. The setting method is not limited to the above-described method, and various forms are usable.

In step S2, an image captured by the image capturing unit 1 is acquired and the acquired image is stored in the memory 2. Some arrangements of the image processing apparatus allow not only image acquisition by image capturing but also that by readout from an image database. Hence, in step S2, various kinds of process forms can be considered.

In step S3, the object detection unit 3 detects an object of the category set in step S1 from the image stored in the memory 2 in step S2. This detection process uses an algorithm based on the spatial layout relationship of local features disclosed in Japanese Patent No. 3078166 or an algorithm based on a convolutional neural network disclosed in Japanese Patent Laid-Open No. 2002-8032. This process makes it possible to do object detection and separation from the background in parallel. Additionally, robust detection is possible even when the size and direction of the object vary.

In step S4, the state detection unit 4 detects the state class of the object detected in step S3. The state class includes the dynamic state and static state of the object and is predetermined for each object. For example, when the object is a person, the state class includes expressions (e.g., smiling face, tearful face, and surprised face) and facial directions and orientations. An expression, direction, and orientation of a face can be detected by a known image recognition technique.

Details have been described above. That is, at the respective classification levels in the structure shown in FIG. 8, the state of the object in the medium class and that in the sub-class are detected. In FIG. 8, the direction and expression of the face are detected in the medium class. For the direction, angles (pan and tilt) are detected in the sub-class. For the expression, one of "smile", "sneer", "loud laugh", "society laugh", and the like is detected in the sub-class.

Referring back to FIG. 3, in step S5, the individual recognition processing unit 5 selects an individual identification process module corresponding to the state class detected in step S4 from the individual identification process module groups held in itself or another memory. Each process module has learned to execute an individual identification process for an object in a corresponding state class, as described above. The process module selected in step S5 has learned about the state class detected in step S4 so that it can execute an individual identification process for the object in the state class.

For example, when the state class detected for the expression in step S4 is "smile", an individual identification process module to execute an individual identification process for a smiling face is selected in step S5.

This allows accurate individual identification while coping with various state classes. Even when the number of objects to be identified increases, the decrease in process efficiency can greatly be suppressed as compared to search from image data containing all state classes.

In step S6, the individual recognition processing unit 5 executes an individual identification process for the object detected in step S3 by using the process module selected in step S5.

If a plurality of objects are detected in step S3, the processes in steps S4 to S6 are executed for each of the detected objects. That is, detection of the state class of the object, selection of an individual identification process module corresponding to the detected state class, and an individual identification process using the selected module are executed for each object.

As described above, when a process (relatively simple process) of determining one of preset types of state classes to which the object belongs is executed before individual recognition, the search range for individual identification in the feature space is efficiently narrowed down. After that, an identification operation is executed by using a process module specialized to the detected state class. This allows more efficient and accurate recognition as compared to individual identification in a set including all state classes.

<Modification>

It may be difficult to generate process modules such as support vector machines corresponding to all state classes of all pairs by learning in advance, as described above. The process modules may be generated cumulatively a posteriori for a person who has failed individual identification. For example, if the reliability of a result of the individual recognition process in step S6 proves to be a predetermined value or less, the process module selected in step S5 executes relearning.

Figure 10:
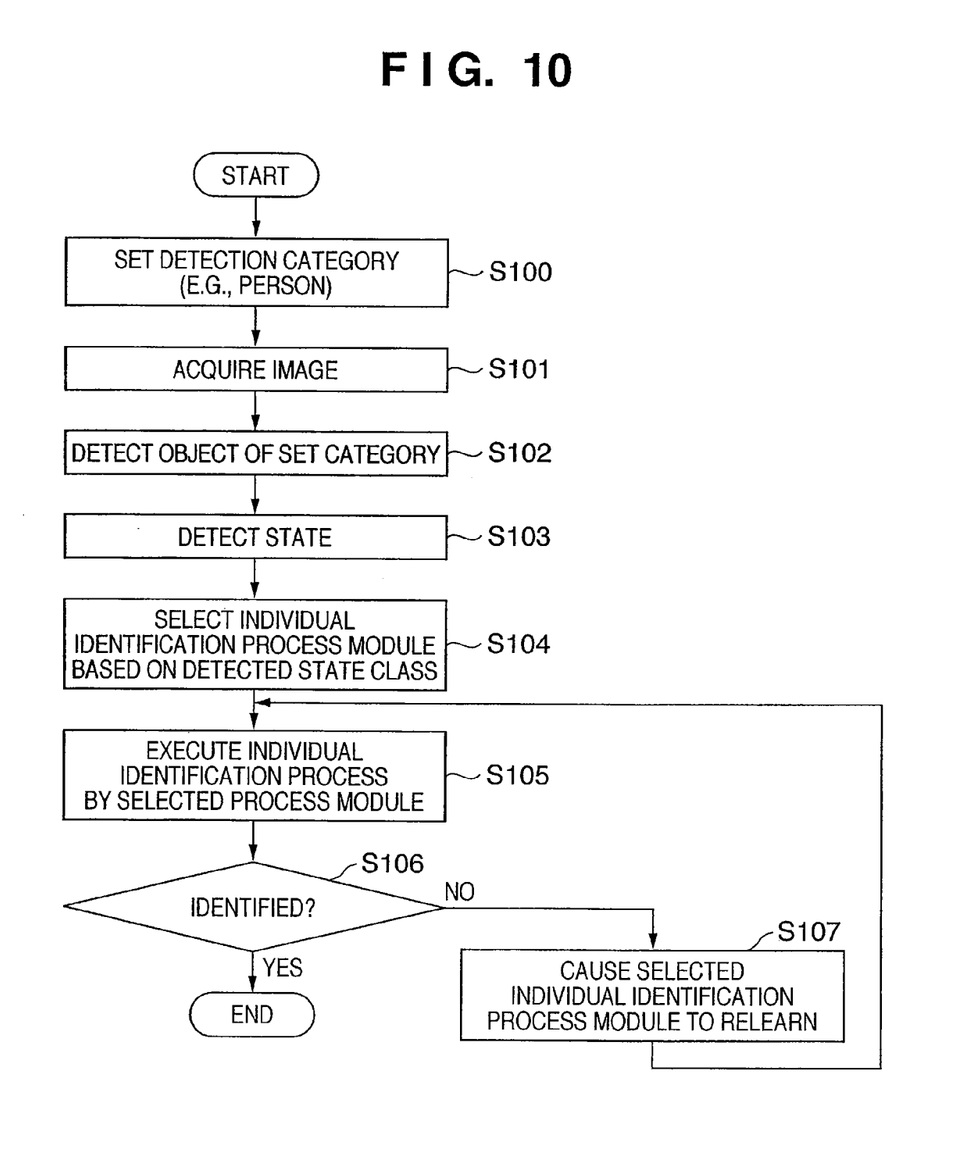
FIG. 10 is a flowchart of a process of determining on the basis of a process result in step S6 whether to execute relearning of a process module used in the individual recognition process and executing relearning in accordance with the determination result in addition to the process shown in FIG. 3.

FIG. 10 is a flowchart of a process of determining on the basis of an individual recognition process result whether to execute relearning of a process module used in the individual recognition process and executing relearning in accordance with the determination result in addition to the process shown in FIG. 3. The processes in steps S100 to S105 are the same as in steps S1 to S6, and a description thereof will not be repeated. However, in step S105, the individual recognition process in step S6 is executed, and additionally, the reliability of the executed individual recognition process is obtained. If the individual recognition process is executed by a neural network, the output value from the final output layer is used as the reliability.

Alternatively, the user may determine whether the process result in step S6 is reliable (reliability=1) or not (reliability=0) by checking the result displayed on the display 7 and input the determination result by using the operation unit 6. The reliability may be input as an analog value, as a matter of course.

In step S106, the control unit 8 determines whether the reliability is more than a predetermined threshold value. If YES in step S106 (if individual recognition has succeeded), the process is ended. If NO in step S106 (if individual recognition has failed), the process advances to step S107. In step S107, relearning of the process module selected in step S104 is performed. More specifically, the image acquired in step S101 and a correct individual identification result are added as teacher data. Relearning of the process module selected in step S104 is executed such that a correct individual recognition process result is output for the image.

As an individual identification process module, not the above-described method based on support vector machines but a hierarchical neural network or a method based on statistical pattern recognition may be used. For example, a method using a convolutional neural network as a hierarchical neural network (reference: Lawrence et al., "Face Recognition: A Convolutional Neural Network Approach", IEEE Transactions on Neural Networks, 1997, Vol. 8, pp. 98-113) may be used as the base. In this case, learning face image data is prepared for each state class, and supervised learning is executed to generate an individual recognition process module.

As described above, the state class (e.g., facial direction and expression) is determined upon face identification and upon learning. A process module specialized to a specific state class is generated on the basis of the result. Alternatively, a specific process module that has undergone learning is selectively activated (not a single process module is always activated) to identify an individual. As for selective activation, individual identification process modules corresponding to classes near the detected state class may be activated.

Second Embodiment

The second embodiment is different from the first embodiment in that the pattern of a time series change of a state class detected in the first embodiment is detected as a state class (motion class) representing (the contents of) a specific motion pattern of an object (person), and individual identification is executed in the motion state class.

Figure 5:
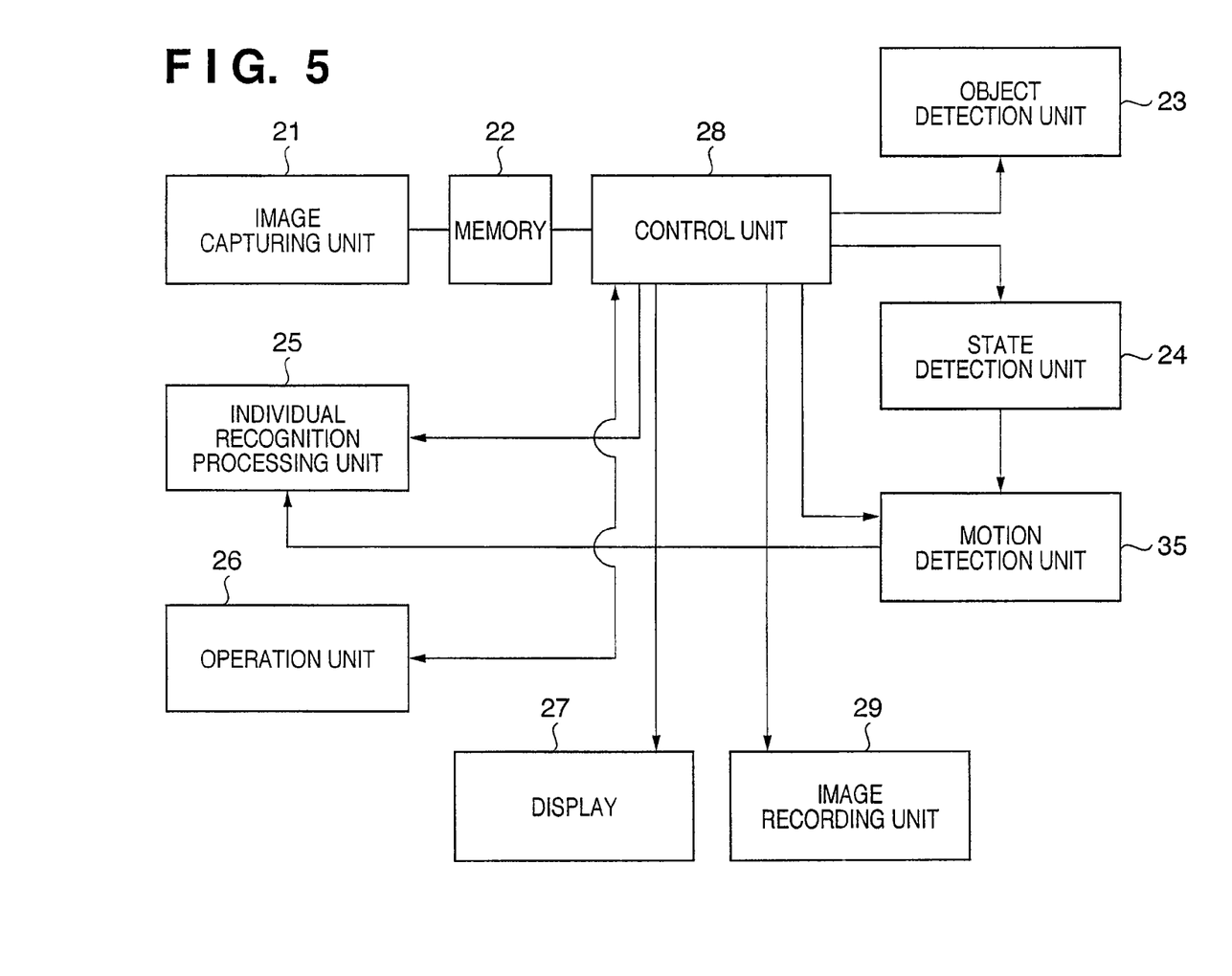
FIG. 5 is a block diagram showing the functional arrangement of an image processing apparatus according to the second embodiment of the present invention.

FIG. 5 is a block diagram showing the functional arrangement of an image processing apparatus according to this embodiment. The arrangement shown in FIG. 5 is obtained by adding a motion detection unit 35 to the arrangement shown in FIG. 1. An image capturing unit 21, memory 22, control unit 28, object detection unit 23, state detection unit 24, individual recognition processing unit 25, operation unit 26, display 27, and image recording unit 29 shown in FIG. 5 are the same as the image capturing unit 1, memory 2, control unit 8, object detection unit 3, state detection unit 4, individual recognition processing unit 5, operation unit 6, display 7, and image recording unit 9 shown in FIG. 1, respectively.

The motion detection unit 35 detects the motion pattern (e.g., the manner of walking, sitting, shaking the head, and posing by folding arms or crossing legs) of an object. Time series data to describe a motion pattern is used as motion pattern collation model data for motion pattern detection. More specifically, the change pattern at the feature point position (in a four-dimensional space including a three-dimensional space and a time axis or a three-dimensional space including a two-dimensional space projected to the image sensor plane and a time axis) of each part of a moving object is used.

In the first embodiment, the individual recognition processing unit 5 determines an individual recognition process module to be used on the basis of only the state class detected by the state detection unit 4. However, the individual recognition processing unit 25 determines an individual recognition process module to be used on the basis of not only the state class detected by the state detection unit 24 but also the motion pattern detected by the motion detection unit 35.

The object detection unit 23 detects, e.g., vehicles or human body parts, like the object detection unit 3 of the first embodiment. The object detection unit 23 also has a multi-category-compliant object detection function capable of detecting a limited kind of objects such as a racket, ball, and other instruments registered in advance.

Figure 6:
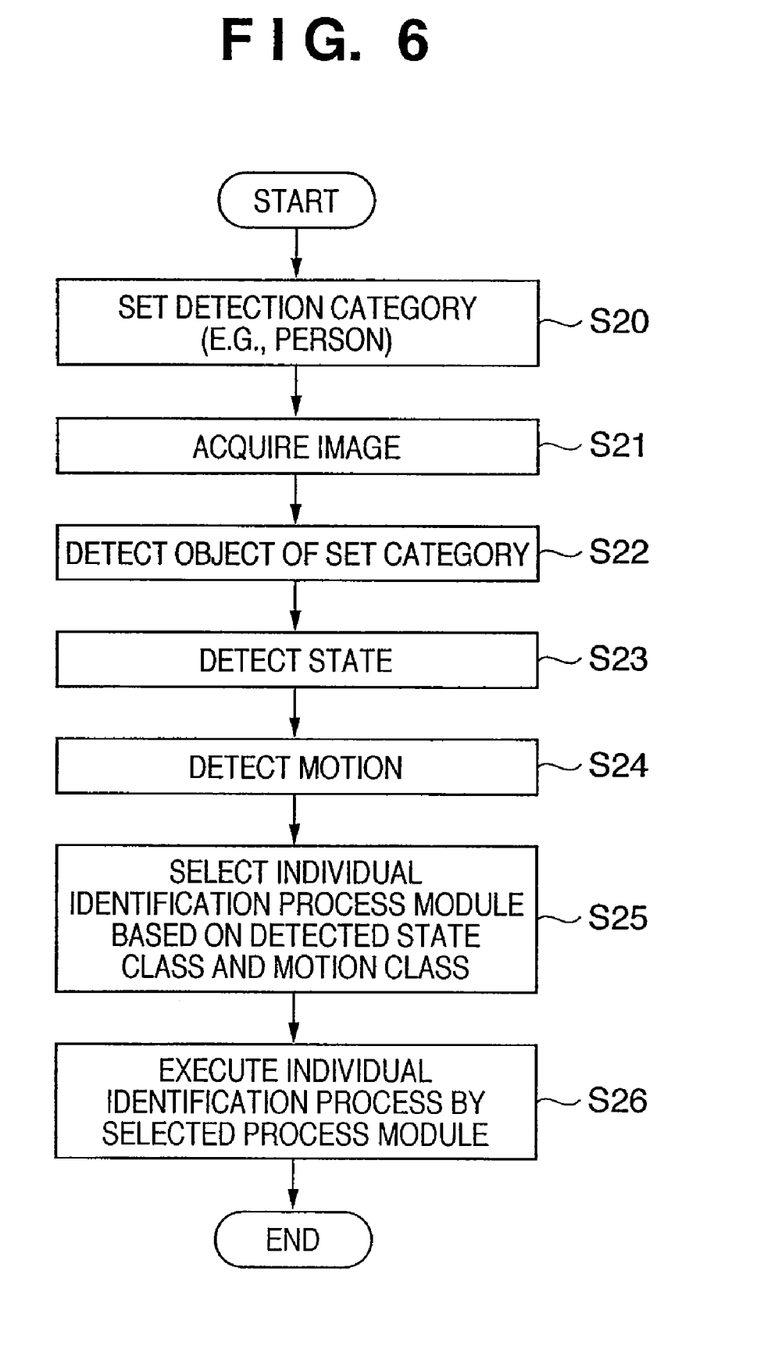
FIG. 6 is a flowchart of an individual identification process executed by the image processing apparatus according to the second embodiment of the present invention.

FIG. 6 is a flowchart of an individual identification process executed by the image processing apparatus according to this embodiment. A memory (not shown) in the control unit 28 stores a program and data to make the units of the image processing apparatus execute the process according to the flowchart in FIG. 6. A CPU (not shown) in the control unit 28 executes the process by using the program so that the image processing apparatus of this embodiment executes each process to be described below.

The processes in steps S20 to S23 are the same as in steps S1 to S4, and a description thereof will not be repeated.

In step S24, the motion pattern of the object is detected on the basis of the time series data of a feature point or state class obtained by the state class detection process in step S23. The process in step S24 will be described later in detail.

In step S25, the individual recognition processing unit 25 selects an individual identification process module corresponding to the state class detected in step S23 or the motion pattern detected in step S24 from the individual identification process module groups held in itself or another memory.

In step S26, the individual recognition processing unit 25 executes an individual identification process for the object detected in step S22 by using the process module selected in step S25.

The process executed by the motion detection unit 35 in step S24 will be explained next.

When the object is a human or an animal, the motion detection unit 35 detects its body motion as a motion pattern. Examples are a specific motion pattern in a certain kind of sports (e.g., a swing motion in golf, tennis, and baseball), a specific posture of a dance, or a gesture or motion of hands with a specific significance.

A recognition process to detect a stereotyped human motion can be done by using a known technique (e.g., continuous dynamic programming, hidden Markov model, or Bayesian network). In this embodiment, the feature of a motion pattern of a specific class and the feature of a state class (in the sense of the first embodiment) at a certain time during a motion are used. On the basis of a peculiar way of motion or the general characteristic of human figure (e.g., silhouette), individual recognition is done by using an individual identification module specialized to the motion or the general characteristic of human figure.

This increases the individual recognition accuracy when it is difficult to identify an object on the basis of only a static outlook of an image (for example, when the illumination conditions are poor, or when the object is far away, and the feature of the face is hard to discriminate because of its small size in the screen).

Figure 9:
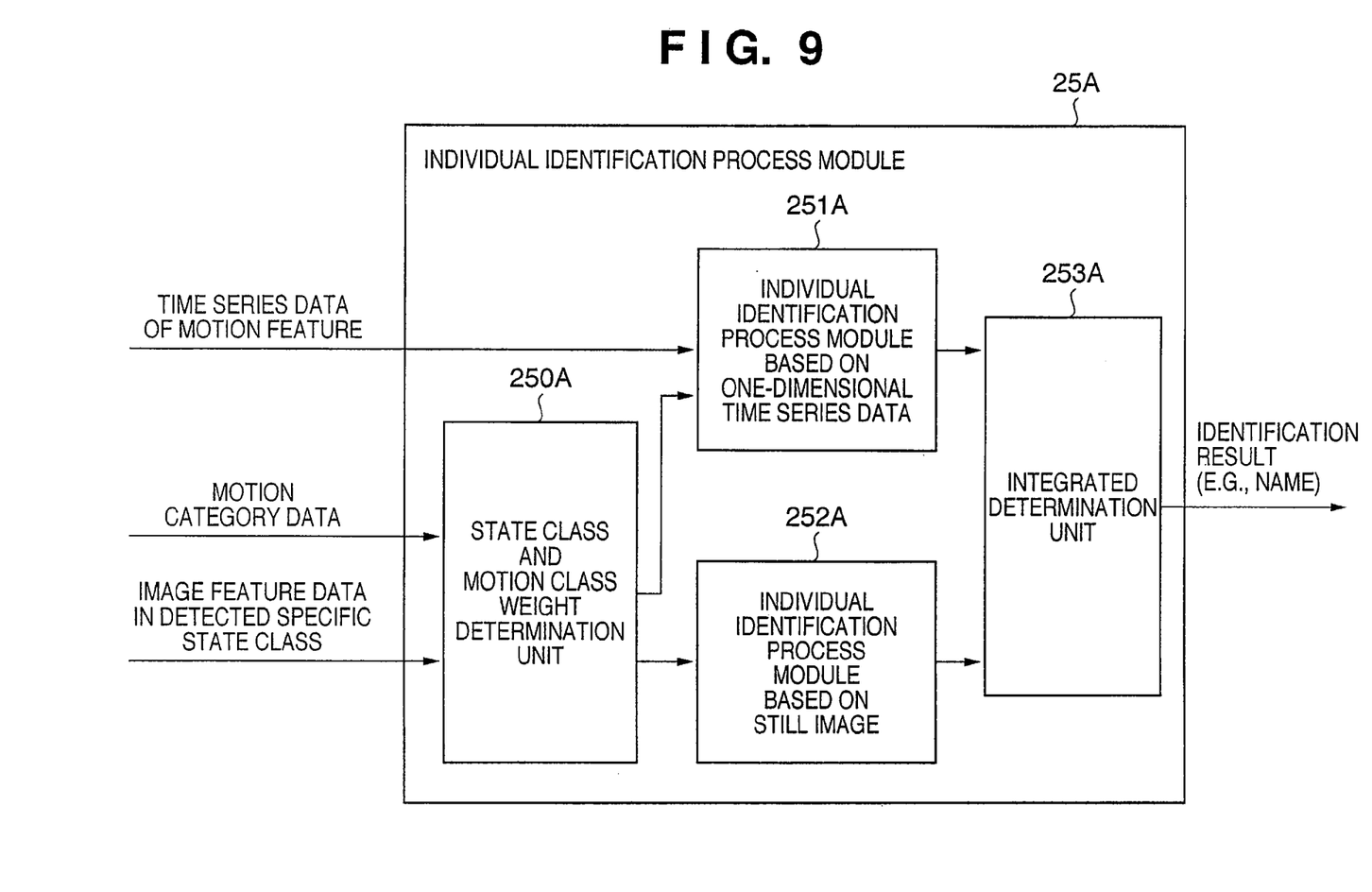
FIG. 9 is a block diagram showing the functional arrangement of an individual recognition process module.

Assume that a specific class A (state class and motion class) is detected, and an individual recognition process module corresponding to the detected specific class A is selected. FIG. 9 is a block diagram showing the functional arrangement of the individual recognition process module.

Referring to FIG. 9, an individual recognition process module 25A corresponds to the specific class A.

A state class and motion class weight determination unit 250A receives image data in a specific state class as in the first embodiment and time series data related to a motion feature, estimates the reliabilities of the two data, and determines the weights of the data on the basis of the reliabilities.

The reliability of each state class is set in a lookup table in advance by values such as a reliability upon object detection (e.g., detection output level), the size of the face (object), the direction of the face (object), and the contrast of the image and stored in, e.g., the memory 22. The reliability of each estimated motion class is also stored in, e.g., the memory 22 in advance as a lookup table on the basis of the size of the object, a reliability upon object detection (e.g., detection level), and a reliability of time series data (e.g., S/N ratio).

An individual identification process module 251A specialized to a specific motion class extracts, by, e.g., wavelet transformation, a feature amount that reflects the waveform or frequency feature of a feature (e.g., the position of a hand or leg, or the angle of neck) in time series data of a specific body motion. On the basis of the feature amount, an individual difference is detected by a pattern recognition technique (e.g., neural network, Bayesian network, or continuous DP).

On the other hand, an individual identification process module 252A specialized to a specific state class executes an individual recognition process in a specific state class such as a facial direction or expression, i.e., the same process as in the first embodiment.

An integrated determination unit 253A multiplies the outputs (values representing identification labels or names and their reliabilities) from the two individual identification process modules 251A and 252A by the above-described weight coefficients of the state class and motion class, thereby calculating weighed identification results. The integrated determination unit 253A outputs an identification result (label or name) with a larger value as a final individual identification result. Identification based on time series data is not the gist of the present invention, and a detailed description thereof will not be done.

As described above, the identification performance can be raised by automatically discriminating a case wherein identification based on a motion feature such as a manner of walking is easier than identification based on a feature of image data in a specific state class such as a face image with a specific direction or expression.

The process in step S24 is executed by using time series data of the state class detected in step S23 and time series data related to a feature amount such as a head position, the direction or size of a face, or the position of a wrist or finger.

If the direction or size of the face falls within a predetermined range (e.g., front ±20° or less and size: 30×30 pixels or more), the motion detection process may be interrupted, and an individual identification module corresponding to the state class may selectively be activated, as in the first embodiment.

In detecting a head, for example, a convolutional neural network (CNN) used for face detection is used. Modules to detect a parietal region, frontal region, and occipital region are formed at the first layer level by learning. A module to detect a head is formed at the second layer level by learning. Detection of a human body part except a head or an instrument such as a racket or a bat can also be done by using, e.g., a convolutional neural network based on detection of the spatial layout relationship of local features that have a complex hierarchical structure. Color components or local spatial frequency information is also usable for these object detection processes.

A swing motion using a racket or bat as in a ball game changes between individuals. To detect a motion pattern reflecting such an individual difference, first, the direction of a human face, the position of a wrist (or a palm or a finger), and the position and orientation of an instrument (e.g., racket) are detected. Next, it is detected that the feature points cyclically move along a locus (e.g., a pattern approximated to an oblate ellipsoid) within a predetermined range while holding a predetermined condition of a relative positional relationship on an image viewed from a predetermined viewpoint. For example, the condition of the relative positional relationship defines that when the head size is used as a unit distance, the position of the wrist with respect to the head is located in a predetermined range of, e.g., seven unit distances.

Figure 7:
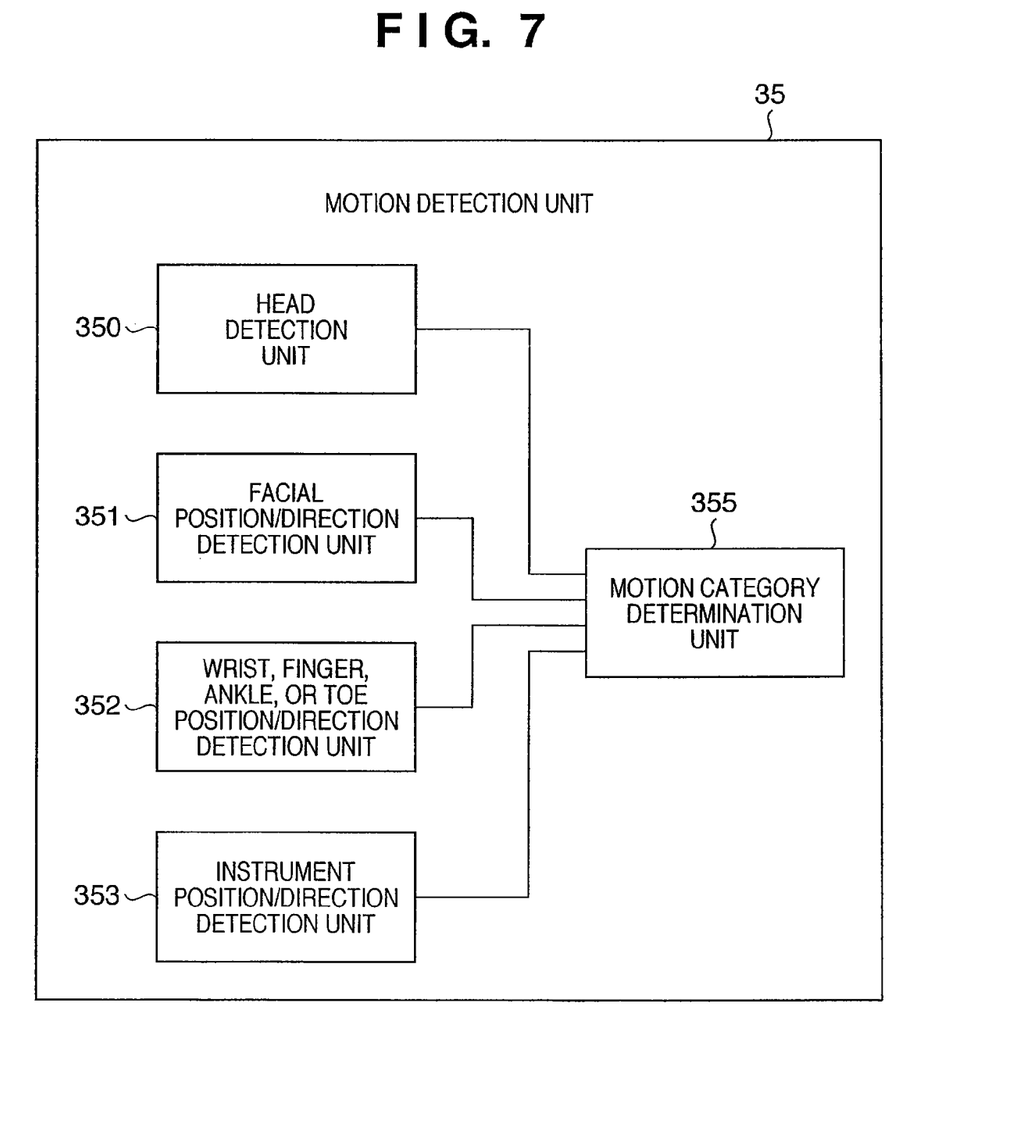
FIG. 7 is a block diagram showing the functional arrangement of a motion detection unit 35.

FIG. 7 is a block diagram showing the functional arrangement of a motion detection unit 35. As shown in FIG. 7, the motion detection unit 35 includes a head detection unit 350, facial position/direction detection unit 351, wrist (finger, ankle, or toe) position/direction detection unit 352, instrument position/direction detection unit 353, and motion category determination unit 355.

The motion category determination unit 355 includes a neural network model (e.g., self-organizing map), Bayesian network mode, or continuous DP model that receives time series data about the head position, facial direction, wrist (palm or finger) position, and the like from the units 350 to 353 and determines a motion class.

As described above, according to the above-described embodiment, a state class such as a human figure or body motion of an object is detected. Individual identification is done by selectively activating an identification module specialized to a specific state class on the basis of the detection result. It is therefore possible to efficiently and accurately execute the identification process as compared to comprehensive individual identification.

The technical contents of the above-described embodiments may be combined as needed.

Other Embodiments

The object of the present invention is also achieved in the following way. A recording medium (or storage medium) which records software program codes to implement the functions of the above-described embodiments is supplied to a system or apparatus. The computer (or CPU or MPU) of the system or apparatus reads out and executes the program codes stored in the recording medium. In this case, the program codes read out from the recording medium themselves implement the functions of the above-described embodiments. The recording medium that stores the program codes constitutes the present invention.

The computer execute the readout program codes, and the operating system (OS) running on the computer partially or wholly executes actual processing on the basis of the instructions of the program codes. This also implements the functions of the above-described embodiments.

The program codes read out from the recording medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-182180, filed Jun. 30, 2006, which is hereby incorporated by reference herein in its entirety.

What is claimed is:

1. An image processing apparatus comprising:
   an acquisition unit adapted to acquire an image including an object;
   an object detection unit adapted to detect the object from the image;
   a state detection unit adapted to detect a state of the detected object from an image region of the detected object;
   a selection unit adapted to select one, which corresponds to the state detected by said state detection unit, from a plurality of individual identification process modules each of which performs an individual identification process specific to the individual identification process module; and
   an individual identification control unit adapted to control the individual identification process module selected by said selection unit to perform an individual identification process specific to the selected individual identification process module for the detected object.

2. The apparatus according to claim 1, wherein said acquisition unit acquire the image by capturing the object.

3. The apparatus according to claim 1, wherein when the image includes a plurality of objects, the series of processes by said objection detection unit, said state detection unit, said selection unit, and said individual identification control unit is executed for each of the objects.

4. The apparatus according to claim 1, wherein
   the plurality of individual identification process modules include an individual identification process module group corresponding to each of a plurality of kinds of objects, and each individual identification process module group includes an individual identification process module corresponding to each state of specific kind of object, and
   said selection unit selects an individual identification process module corresponding to the state detected by said state detection unit from the individual identification process module group, which corresponds to the detected object.

5. The apparatus according to claim 1, wherein said individual identification control unit makes the individual identification process module selected by said selection unit perform relearning to control the individual identification process module after relearning to execute the individual identification process of the detected object if the individual identification process module selected by said selection unit has been unable to execute individual identification of the detected object.

6. The apparatus according to claim 1, further comprising a motion detection unit adapted to detect a motion pattern of the detected object,
   wherein said selection unit selects an individual identification process module corresponding to the state detected by said state detection unit and the motion pattern detected by said motion detection unit.

7. The apparatus according to claim 1, wherein the object is a person, and the state is one of an expression type and a facial direction of the person.

8. The apparatus according to claim 1, wherein the object is one of a person and an animal, and the state is an orientation of the object.

9. The apparatus according to claim 1, further comprising a motion detection unit adapted to detect a motion represented by a change pattern of the state related to the detected object, wherein when said motion detection unit detects a specific motion, said selection unit selects one, which corresponds to the specific motion, from the plurality of individual identification process modules.

10. The apparatus according to claim 1, wherein a support vector machine is used in the individual identification process module.

11. The apparatus according to claim 1, wherein one of a hierarchical neural network and a convolutional neural network is used in the individual identification process module.

12. An image processing method comprising the steps of:
acquiring an image including an object;
detecting the object from the image;
detecting a state of the detected object from an image region of the detected object;
selecting one, which corresponds to the state detected in the state detecting step, from a plurality of individual identification process modules each of which performs an individual identification process specific to the individual identification process module; and
controlling the individual identification process module selected by the selecting step to perform an individual identification process specific to the selected individual identification process module for the detected object.

13. A non-transitory computer-readable storage medium storing a program which causes a computer to execute an image processing method of claim 12.

* * * * *